United States Patent
Suto

(10) Patent No.: US 10,853,294 B2
(45) Date of Patent: *Dec. 1, 2020

(54) STORAGE DEVICE AND SERVER DEVICE

(71) Applicant: Toshiba Memory Corporation, Minato-ku, Tokyo (JP)

(72) Inventor: Hiroyuki Suto, Kamakura Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/539,550

(22) Filed: Aug. 13, 2019

(65) Prior Publication Data

US 2019/0370204 A1 Dec. 5, 2019

Related U.S. Application Data

(63) Continuation of application No. 16/152,712, filed on Oct. 5, 2018, now Pat. No. 10,394,741, which is a
(Continued)

(30) Foreign Application Priority Data

Mar. 17, 2015 (JP) ................. 2015-052884

(51) Int. Cl.
*G06F 13/40* (2006.01)
*G06F 1/3287* (2019.01)
*G06F 3/06* (2006.01)

(52) U.S. Cl.
CPC ........ *G06F 13/4022* (2013.01); *G06F 1/3287* (2013.01); *G06F 3/06* (2013.01); *H05K 999/99* (2013.01)

(58) Field of Classification Search
CPC ....... G06F 3/06; G06F 13/4022; G06F 1/3287
See application file for complete search history.

(56) References Cited

U.S. PATENT DOCUMENTS 6,292,426 B1  9/2001  Ikeda et al.
7,711,391 B2  5/2010  Zatloukal et al.
(Continued)

FOREIGN PATENT DOCUMENTS

JP          2012-216672 A    11/2012

*Primary Examiner* — Farley Abad
(74) *Attorney, Agent, or Firm* — White & Case LLP

(57) ABSTRACT

According to one embodiment, a storage device includes a memory, a controller, an interface unit, a switch, and a switch control unit. The memory stores data. The controller is configured to control writing of data to the memory and reading of data from the memory. The interface unit includes a first terminal, a second terminal, and a third terminal. The first terminal has an electrical status different between a case where the storage device and a first device are connected, and a case where the storage device and a second device are connected. Through the second terminal, voltage is applied by the first device to the storage device in the case where the storage device and the first device are connected, and a control signal is input from the second device to the storage device in the case where the storage device and the second device are connected. Through the third terminal, power is supplied to the storage device. The switch switches a connection status and a disconnection status. In the connection status, the third terminal and the controller are electrically connected. In the disconnection status, the third terminal and the controller are electrically disconnected. The switch control unit is configured to control the switch to switch the connection status and the disconnection status based on electrical statuses of the first terminal and the second terminal.

21 Claims, 9 Drawing Sheets

Related U.S. Application Data continuation of application No. 15/790,367, filed on Oct. 23, 2017, now Pat. No. 10,114,785, which is a continuation of application No. 14/824,418, filed on Aug. 12, 2015, now Pat. No. 9,811,489.

(60) Provisional application No. 62/131,746, filed on Mar. 11, 2015.

(56) References Cited

U.S. PATENT DOCUMENTS

| | | |
|---|---|---|
| 8,687,377 B2 | 4/2014 | Harashima et al. |
| 2004/0169072 A1 | 9/2004 | Peng |
| 2010/0248551 A1 | 9/2010 | Harada |

FIG.5

| PIN | SAS1, SAS2, SAS2.1 | SAS3 |
|---|---|---|
| 1 | 3.3 [V] | VENDER SPECIFIC |
| 2 | | 3.3 [V] |
| 3 | | POWER DISABLE |
| 4 | GND | |
| 5 | GND | |
| 6 | GND | |
| 7 | 5 [V] | |
| 8 | 5 [V] | |
| 9 | 5 [V] | |
| 10 | GND | |
| 11 | GND | |
| 12 | GND | |
| 13 | 12 [V] | |
| 14 | 12 [V] | |
| 15 | 12 [V] | |

FIG.6

| | | (1) | (2) | (3) | (4) |
|---|---|---|---|---|---|
| | | SAS1, SAS2, SAS2.1 | | SAS3 | |
| | | APPLICATION OF 3.3 [V] | NO APPLICATION OF 3.3 [V] | CORRESPONDENCE TO POWER DISABLE | NO CORRESPONDENCE TO POWER DISABLE |
| PIN | 1 | H | NC | NC | H/L/NC |
| | 3 | H | NC | H/L | NC |
| SW | | C (AC) | C (AC) | S/C | C (AC) |

| | P1 | P3 | Ss | SW | SPECIFICATION |
|---|---|---|---|---|---|
| (a) | H | H | L | C | (1) |
| (b) | L | L | L | C | (2), CASE WHERE P3 OF (3) IS L, CASE WHERE P1 OF (4) IS L OR NC |
| (c) | L | H | H | S | CASE WHERE P3 OF (3) IS H |
| (d) | H | L | L | C | CASE WHERE P1 OF (4) IS H |

STORAGE DEVICE AND SERVER DEVICE

CROSS-REFERENCE TO RELATED APPLICATIONS

This application is a continuation of U.S. application Ser. No. 16/152,712, filed Oct. 5, 2018, which is a continuation of U.S. application Ser. No. 15/790,367, filed Oct. 23, 2017, now U.S. Pat. No. 10,114,785 issued Oct. 30, 2018, which is a continuation of U.S. application Ser. No. 14/824,418, filed Aug. 12, 2015, now U.S. Pat. No. 9,811,489 issued Nov. 7, 2017, which claims the benefit of priority from U.S. Provisional Application No. 62/131,746, filed on Mar. 11, 2015 and Japanese Patent Application No. 2015-052884, filed on Mar. 17, 2015; the entire contents of which are incorporated herein by reference.

FIELD

Embodiments described herein relate generally to a storage device and a server device.

BACKGROUND

Conventionally, there is known a storage device which is used in assembly with a host device such as a server.

Such a type of storage device is desirably used in each case where the storage device is assembled in a plurality of server devices having different specifications while suppressing a defect.

BRIEF DESCRIPTION OF THE DRAWINGS

FIG. 5 is a table listing pin assignment of a power source interface of SAS;

FIG. 6 is a table listing electrical statuses of pins P1 to P3 of the power source interface of SAS according to the specifications (SAS1, SAS2, SAS2.1, and SAS3) of the interface of the server device;

DETAILED DESCRIPTION

In general, according to one embodiment, a storage device includes a memory, a controller, an interface unit, a switch, and a switch control unit. The memory stores data. The controller is configured to control writing of data to the memory and reading of data from the memory. The interface unit includes a first terminal, a second terminal, and a third terminal. The first terminal has an electrical status different between a case where the storage device and a first device are connected, and a case where the storage device and a second device are connected. Through the second terminal, voltage is applied by the first device to the storage device in the case where the storage device and the first device are connected, and a control signal is input from the second device to the storage device in the case where the storage device and the second device are connected. Through the third terminal, power is supplied to the storage device. The switch switches a connection status and a disconnection status. In the connection status, the third terminal and the controller are electrically connected. In the disconnection status, the third terminal and the controller are electrically disconnected. The switch control unit is configured to control the switch to switch the connection status and the disconnection status based on electrical statuses of the first terminal and the second terminal.

Hereinafter, an exemplary embodiment and modifications of a storage device and a server device (a host device) will be described. The configuration and the control (technical feature) described below and the operation and the result (effect) brought from the configuration and the control are given as a mere example. In addition, the embodiment and the modifications described below include the similar components. Hereinafter, the similar components will be denoted with the same symbols, and the redundant descriptions will not be repeated.

Embodiment

Figure 1:
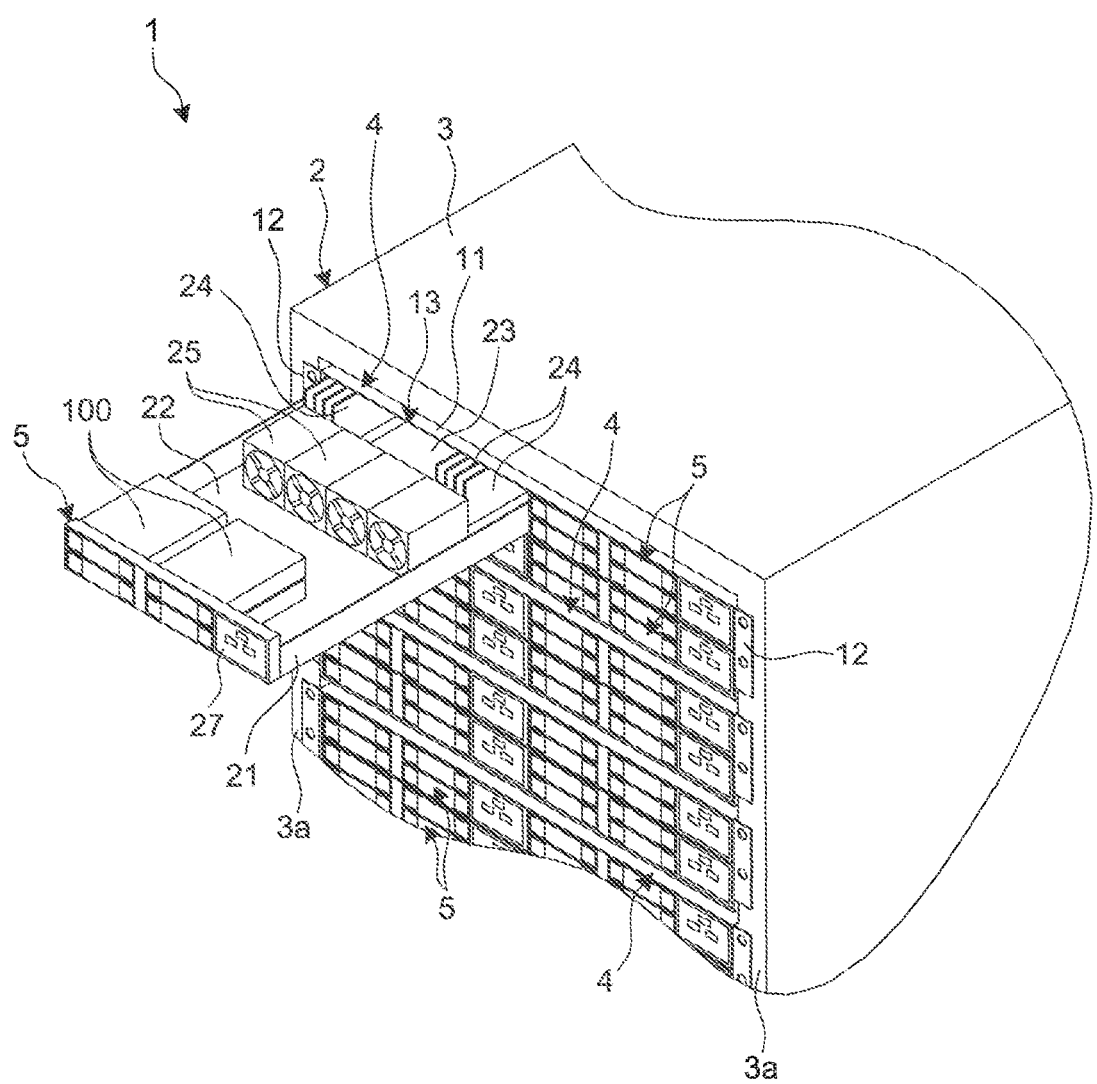
FIG. 1 is an exemplary perspective view illustrating a server device which includes a storage device according to an embodiment.

FIG. 1 is an exemplary perspective view illustrating a server device which includes a storage device according to the embodiment. A data center 1, for example, includes various devices such as a plurality of server farms 2, a router, and a switching hub, and various parts such as cables to connect these devices. Further, FIG. 1 illustrates one server farm 2. In addition, FIG. 1 illustrates a state in which one server module 5 is drawn out to the front side in the front and back direction.

The server farm 2 includes a rack 3, a plurality of module enclosures 4, and a plurality of server modules 5. In each module enclosure 4, the plurality of server modules 5 is stored. The module enclosure 4 storing the plurality of server modules 5 forms a rack mount server. Further, the server of the data center 1 is not limited, and another server such as a blade server may be employed. The data center 1, the server farm 2, and the server module 5 are an example of the server device, and may be called a host device, a host system, a server system, or a storage system.

The rack 3 includes two struts 3a. In the strut 3a, a plurality of screw holes are provided. The two struts 3a are disposed to be separated from each other. The module enclosure 4 can be inserted between the two struts 3a.

The module enclosure 4 includes an enclosure case 11 and a mounting member 12. The module enclosure 4 may further include a power source unit which is stored in the enclosure case 11. In the enclosure case 11, for example, four module slots 13 are provided.

The mounting member 12 is extended toward the outside of the enclosure case 11 in a lateral direction from the end portion in the front of the enclosure case 11. In the mounting member 12, a hole is provided to correspond to the screw hole of the strut 3a. The mounting member 12, for example, is fixed to the strut 3a of the rack 3 by a screw or a bolt. Therefore, the module enclosure 4 is mounted on the rack 3.

The server module 5 can be inserted in the module slot 13 of the enclosure case 11. When the server module 5 is inserted in the module slot 13, for example, the power is supplied from the power source unit of the module enclosure 4. Further, the server module 5 may be supplied with the power from another device.

The server module 5, for example, includes a module case 21, a module board 22, a control unit 23, a plurality of memories 24, a plurality of fans 25, and a plurality of storage devices 100. The module case 21 is an example of a first housing, and for example, may be also called a wall. The module board 22 is an example of a first board, and for example may be also called a wiring board or a circuit board. The fan 25 is an example of a blower unit, and for example may be also called a cooling device. The control unit 23, for example, is a central processing unit (CPU). The storage device 100 may be also called an apparatus, a storage, a device, an electronic apparatus, a module, a component, or the like. In this embodiment, the storage device 100, for example, is a solid state drive (SSD), and may be also another device such as a hard disk drive (HDD) or a hybrid hard disk drive (a hybrid HDD). In addition, the storage device 100 may be not provided with a housing depending on a usage or an application.

The module case 21, for example, has an open upper portion and is formed in a box of the almost rectangular shape which is extended in the front and back direction. Further, the shape of the module case 21 is not limited to the above shape, and for example may be formed in a box of which the upper portion is closed. In the module case 21, the module board 22, the control unit 23, the memory 24, the fan 25, the storage device 100, and other components are contained.

The module case 21 has a front panel 27. The front panel 27 is a wall which is provided in the end portion in the front of the module case 21. In the front panel 27, various connectors such as a USB connector are provided.

The module board 22, for example, is a printed wiring board. Further, the module board 22 may be other boards. In the module board 22, the control unit 23, the memory 24, the fan 25, the storage device 100, and other components are mounted directly or through other components.

The fan 25 is disposed between the control unit 23 (and the memory 24) and the storage device 100. By the operation of the fan 25, a flow of the air of the front and back direction occurs in the inner portion of the module case 21. By the air flow generated by the fan 25, the control unit 23, the memory 24, the storage device 100, and other components can be cooled down. Further, the air flow generated by the fan 25 may flow in another direction.

Each of the storage devices 100, for example, is contained in a drive cage which is mounted on the front panel 27.

Figure 2:
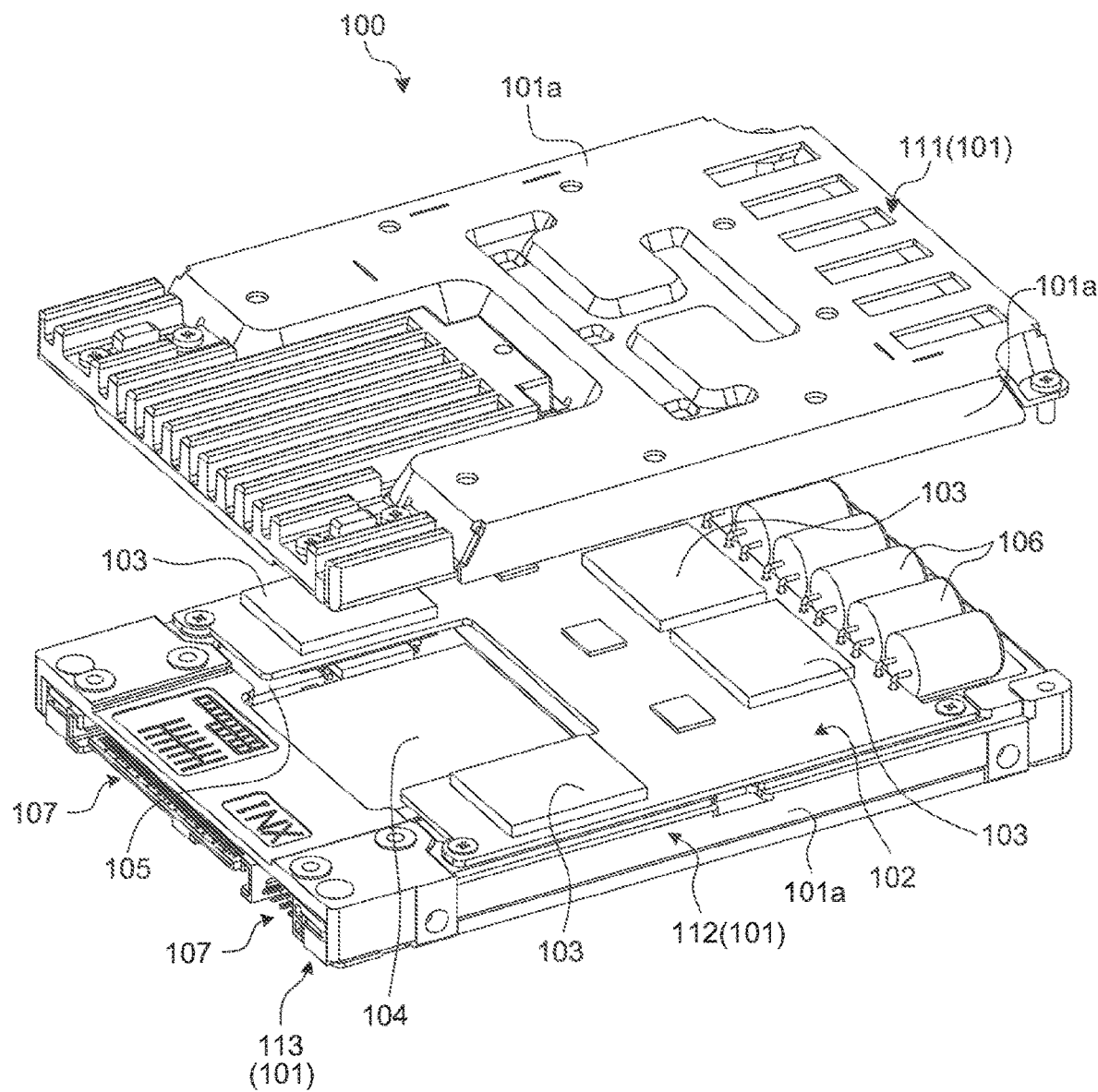
FIG. 2 is an exemplary exploded perspective view illustrating the storage device according to the embodiment.

FIG. 2 is an exemplary exploded perspective view illustrating the storage device according to the embodiment. As illustrated in FIG. 2, the storage device 100, for example, includes a case 101, a circuit board 102, a plurality of memories 103, a controller 104, a plurality of data buffers 105, a plurality of capacitors 106, and an interface unit 107.

The case 101, for example, may be called a cover, a cover unit, or a wall. The circuit board 102, for example, may be called a substrate or a wiring board. The memory 103, for example, may be called a storage unit, an element, or a component. The controller 104, for example, may be called a control unit, an arithmetic processing unit, an element, or a component. The interface unit 107, for example, may be called a connector or a connection unit.

The case 101, for example, includes a plurality of members (components) such as an upper case 111, a frame 112, and a lower case 113. A plurality of members are coupled by fixing tools such as screws, and the case 101 is formed. The case 101 includes a plurality of walls 101a, and the components of the storage device 100 (that is, the circuit board 102, the memory 103, the controller 104, the data buffer 105, the capacitor 106, and the like) are contained in a space surrounded by the walls 101a. The case 101, for example, is made of a metal material such as an aluminum alloy.

Figure 3:
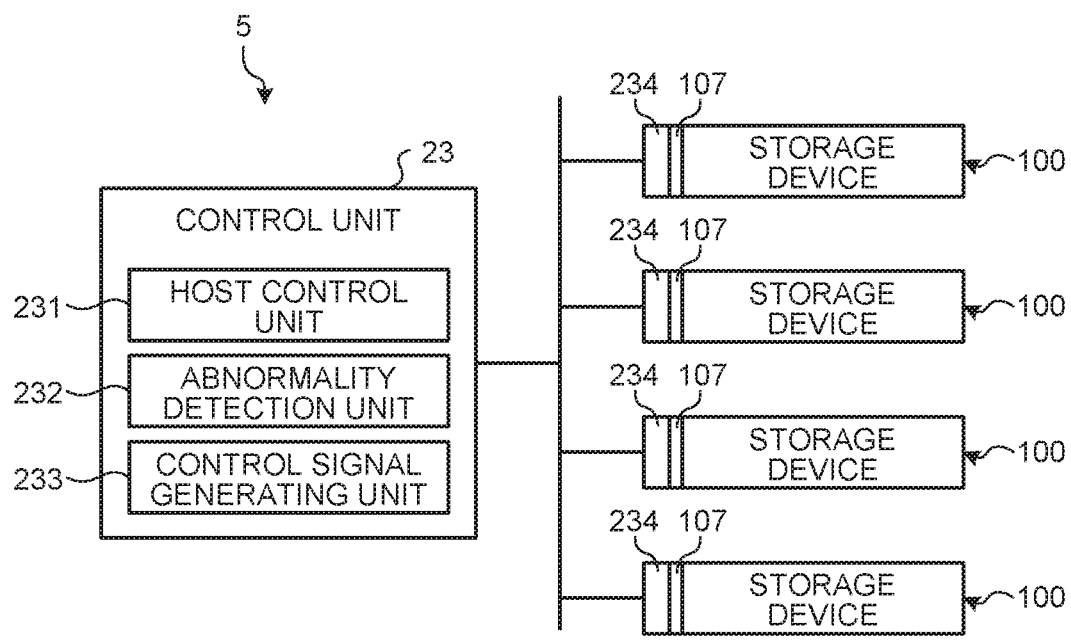
FIG. 3 is an exemplary block diagram schematically illustrating the server device according to the embodiment.

FIG. 3 is an exemplary block diagram schematically illustrating the sever device according to the embodiment. The control unit 23 of the server module 5 serving as the server device includes a host control unit 231, an abnormality detection unit 232, and a control signal generating unit 233. The host control unit 231 controls the operations of the respective portions of the server module 5, a data writing to the plurality of storage devices 100, and a data reading from the plurality of storage devices 100. The abnormality detection unit 232 detects an abnormality caused in the storage device 100. The abnormality of the storage device 100, for example, may detect whether there is no response to a command within a predetermined time, or whether the data writing or the data reading in the storage device 100 is not ended even in excess of an expected or predetermined time. In a case where the abnormality detection unit 232 detects an abnormality in the storage device 100 for which a power on resetting is necessary, the control signal generating unit 233 generates a control signal to perform the power on resetting. The control signal, for example, is a power disable signal. The power disable signal is a request for the storage device 100 of the disconnection of switches SW1 and SW2 (see FIG. 7) which are provided in a power line in the storage device 100.

The data is transferred between the control unit 23 and the storage device 100 by connecting the interface unit 107 of the storage device 100 and an interface unit 234 of the server module 5, and by electrically connecting the pins provided in the interface units 107 and 234.

Figure 4:
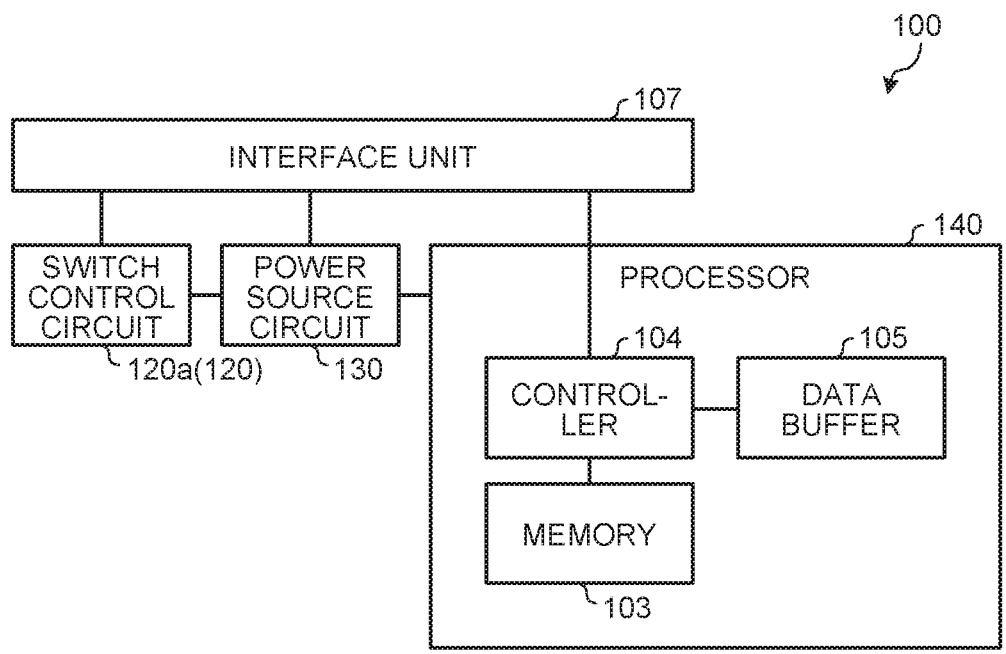
FIG. 4 is an exemplary block diagram schematically illustrating the storage device according to the embodiment.

FIG. 4 is an exemplary block diagram schematically illustrating the storage device according to the embodiment. The storage device 100 includes a switch control circuit 120a, a power source circuit 130, and a processor 140. The switch control circuit 120a is an example of a switch control unit 120. In this embodiment, the switch control circuit 120a is provided on the circuit board 102, by a plurality of elements (electronic components) are mounted on the circuit board 102. The power source circuit 130 includes a switch and a fuse. The switch control circuit 120a (the switch control unit 120) and the power source circuit 130 will be described in detail below. In each unit included in the processor 140, the electric power is supplied from the power source circuit 130. Further, in FIG. 4, the memory 103, the controller 104, and the data buffer 105 are illustrated separately, but the number of the respective components is not limited to 1. Further, the processor 140 is a name for convenience sake. The processor 140 may be an SSD formed in one integrated package.

The memory 103 is a nonvolatile memory, and for example a NAND flash memory. The memory 103 is not limited to the NAND flash memory, and may be a resistance random access memory (RERAM) or a ferroelectric random access memory (FERAM). In addition, the memory 103 stores user data transmitted from the outside (the host device and the server device) of the storage device 100, or system data used only in the storage device 100. In addition, the memory 103 includes a memory cell array in which a plurality of memory cells (not illustrated) are arranged in a matrix shape. Each of the memory cells can store binary value or multi-value data. In addition, the memory 103 includes a plurality of memory chips.

The data buffer 105 temporarily stores the data. The data buffer 105, for example, is a dynamic static random access memory (DRAM). Further, the data buffer 105 is not limited to the DRAM, or may be a static random access memory (SRAM). The data buffer 105 may be independently provided from the controller 104, or may be mounted as a memory incorporated in the chip of the controller 104.

The controller 104 controls the storage device 100. The function of the controller 104, for example, is realized by a processor which executes firmware stored in a read only memory (ROM) of the memory 103 or the controller 104, or hardware. The controller 104 reads out the data from the memory 103, or writes the data in the memory 103 according to a command from the host device.

The interface unit 107 has a plurality of pins (terminals) through which electrical signals or the power is transferred with respect to an external device. The interface unit 107 is configured in conformity to a serial attached SCSI (SAS).

FIG. 5 is a table listing an example of pin assignment of a power source interface in conformity to the SAS. As illustrated in FIG. 5, in the power source interface of the SAS, total 15 pins P1 to P15 (terminals) are provided, and among them, the ground is assigned to the pins P4 to P6, a 5 [V] power is assigned to the pins P7 to P9, the ground is assigned to the pins P10 to P12, and a 12 [V] power is assigned to the pins P13 to P15. In addition, in the case of SAS1, SAS2, and SAS2.1, a 3.3 [V] power is assigned to the pins P1 to P3. On the other hand, in the case of SAS3, the pins P1 and P2 are differently specified depending on a vender of the host device (the server device), and the pin P3 is assigned depending on a vender of the host device or assigned with the control signal (power disable) which is used to stop the supplying of the power from the host to the storage device. Further, regarding the storage device connected to the host device, it is defined that the pins P1 to P3 are electrically connected to each other in the case of SAS1, SAS2, and SAS2.1, and the pins P1 and P2 are electrically connected to each other in the case of SAS3.

In this way, in the SAS standard, the pin assignment of the pins P1 to P3 are different between the legacy systems SAS1, SAS2, and SAS2.1 and a new system SAS3.

There is a host device in conformity to SAS1, SAS2, and SAS2.1 which are available so far, and the storage device in conformity to SAS3 may be desirably integrated (connected) to the hose device in conformity to SAS1, SAS2, and SAS2.1 as well as the host device in conformity to SAS3.

However, as described above, in a case where the pin assignment is different according to the standard, it may be difficult to use the storage device in conformity to one standard in the host device of another standard. Specifically, for example, regarding the power source interface of the above-mentioned SAS, in a case where the storage device using the control signal (power disable) of the pin P3 in conformity to SAS3, for example, is integrated to the host device which is in conformity to SAS1 and applies the 3.3 [V] voltage to the pin P3, the potential of the pin P3 of the storage device becomes always 3.3 [V]. In this case, the storage device performs its operation in a case where the control signal through the pin P3 is always at the high level. In the storage device corresponding to the power disable, a switch to switch the supplying of the power and the stopping of the supply is provided, and the high level of the control signal through the pin P3 corresponds to a command of the disconnection (turning off switch or stopping the power supplying) to the switch. Accordingly, in this case, since the storage device keeps the disconnected status of the switch based on 3.3 [V] (that is, the high level of the power disable) of the pin P3, the storage device is not supplied with the power. Therefore, the storage device using the control signal (power disable) of the pin P3 in conformity to SAS3 may be not used as it is, in the server device in conformity to SAS1.

In the storage device 100 according to this embodiment, there is provided the switch control unit 120 which can avoid such a situation. The switch control unit 120 controls the switch based on the electrical statuses of the pins P1 to P3 using the feature that the electrical statuses of the pins P1 to P3 are different according to the standard of the host device and the control signal from the host device. Further, the host device, for example, is the data center 1, the server farm 2, or the server module 5. In addition, the pins P1 to P3 and the above-mentioned pins P4 to P15 are included in the interface unit 107.

FIG. 6 is a table listing the electrical statuses of the pins P1 to P3 according to the specifications (SAS1, SAS2, SAS2.1, and SAS3) of the interface of the host device. In FIG. 6, the electrical statuses of the pins P1 to P3 are listed with respect to the following four specifications (1) to (4) described below. The types of (1) to (4) are typical specifications which are practically used at the moment.

(1) The host device which is in conformity to SAS1/2/2.1 and applied with 3.3 [V].

(2) The host device which is in conformity to SAS1/2/2.1 and not applied with 3.3 [V].

(3) The host device which is in conformity to SAS3 and corresponds to the power disable.

(4) The host device which is in conformity to SAS3 and does not correspond to the power disable.

In FIG. 6, "H" indicates the high level, "L" indicates the low level, and "NC" indicates a non-connection status. In addition, the non-connection status may be also called an open status or a floating status. In addition, "SW" indicates the switch, "C" indicates the connection status of the switch, "AC" is an always connection status of the switch, and "S" indicates the disconnection status of the switch. As described above, since the pins P1 and P2 are electrically connected to each other even in the SAS3, the electrical statuses of the pins P1 and P2 are the same. The switch control unit 120 according to this embodiment sets the status of the switch illustrated in FIG. 6 according to a combination of the electrical statuses (for example, the potential) of the pins P1 and P2 and the pin P3 illustrated in FIG. 6. Therefore, even in a case where any host device of any one of the specifications (1) to (4) is connected, an expected process is performed while avoiding the above-mentioned defective situation. In this embodiment, the pins P1 and P2 are an example of the first terminal, the pin P3 is an example of the second terminal, and the pins P7 to P9 and P13 to P15 are an example of the third terminal.

Figure 7:
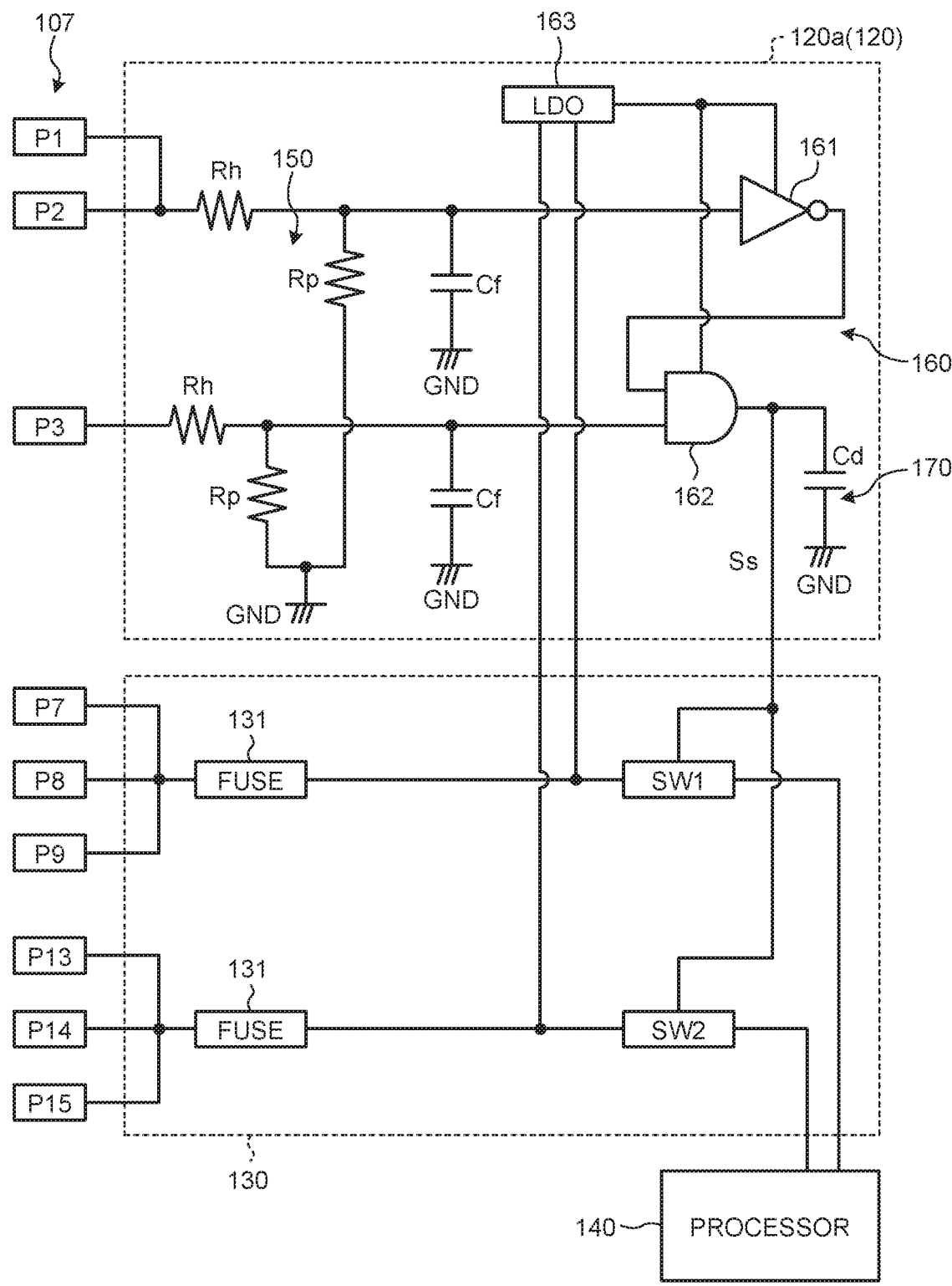
FIG. 7 is an exemplary circuit diagram schematically illustrating a switch control unit which is included in the storage device according to the embodiment.

FIG. 7 is an exemplary circuit diagram schematically illustrating the switch control unit 120. As illustrated in FIG. 7, in this embodiment, the switch control unit 120 includes a logical circuit 160 which contains logical gates such as a NOT circuit 161 (an inverter) and an AND circuit 162. In other words, the switch control unit 120 generates a signal Ss which is used to switch the connection and the disconnection of the switches SW1 and SW2 (SW of FIG. 6) through a logical operation using the high level and the low level which are set by the electrical statuses (for example, the potentials) of the pin P1 (or the pin P2) and the pin P3. The high level and the low level, for example, are set according to a magnitude with respect to a threshold of a predetermined potential. In the case of the SAS, the high level is set to about 3.3 [V] as the potential of the power source, and the low level is set to about 0 [V] as the potential of the ground. Further, the logical circuit 160 illustrated in FIG. 7 is an example, and the switch control unit 120 may include a logical circuit which is equivalent to the circuit illustrated in FIG. 7 and includes different logical gates therefrom. Further, as described above, since the pin P2 is electrically connected to the pin P1, the description in this specification may be made about the pin P1 as a representative of the pin P1 and the pin P2.

In addition, in the case of the non-connection status (NC), since the pins P1 to P3 are not electrically connected to both of a conductive portion having the potential of the power source and a conductive portion having the potential of the ground in the host device, the potentials of the pins P1 to P3 in this status become a potential (another potential) different from those of the power source and the ground (the floating status) as it is. Accordingly, the floating status can be identified by providing a configuration to detect another potential. In addition, since impedance in the floating status becomes larger, the floating status can be identified by the impedance. In this embodiment, as an example, a pull-down circuit 150 having a resistance Rp (a pull-down resistance) is provided in between the pin P1 and the ground GND and between the pin P3 and the ground GND. Therefore, the switch control unit 120 identifies the non-connection status as the low level, and can perform an arithmetic process with relative ease. Further, in the example of FIG. 6, there is no problem caused by setting the non-connection status to the low level. In addition, a resistance value of the resistance Rp is set to a value which can be kept at the high level in a case where the pin P1 and the pin P3 are at the high level. The resistance Rp and the pull-down circuit 150 connected to the pin P1 are an example of a first resistance and a first pull-down circuit, and the resistance Rp and the pull-down circuit 150 connected to the pin P3 are an example of a second resistance and a second pull-down circuit.

In addition, as illustrated in FIG. 7, in the switch control unit 120, a resistance Rh is provided in series with the pin P1, and the resistance Rh is provided in series with the pin P3. With such a configuration, even in a case where the power is steeply increased when the switches SW1 and SW2 are switched from the disconnection status to the connection status, the energy can be consumed by the resistance Rh. In other words, in the switch control unit 120, it is possible to suppress the power from being steeply increased in a portion opposite to the host device compared to the resistance Rh. In this embodiment, the resistance Rh is provided between the processor 140 and the pins P1 and P3 (that is, between the logical gates (the NOT circuit 161 and the AND circuit 162) and the pins P1 and P3).

In addition, a capacitor Cf is provided between the pin P1 and the ground GND, and the capacitor Cf is provided between the pin P3 and the ground GND. Therefore, it is possible to remove high frequency components from the power input from the pin P1 or P3 to the switch control unit 120.

In the logical circuit 160, the NOT circuit 161 inverses the high level and the low level of the potential of the pin P1 and outputs the inverted potential. In addition, the AND circuit 162 outputs a logical product of the level of the output potential of the NOT circuit 161 and the level of the potential of the pin P3. In a case where the output potential of the AND circuit 162 is at the low level, the switches SW1 and SW2 enter the disconnection status.

Figures 8, 9:
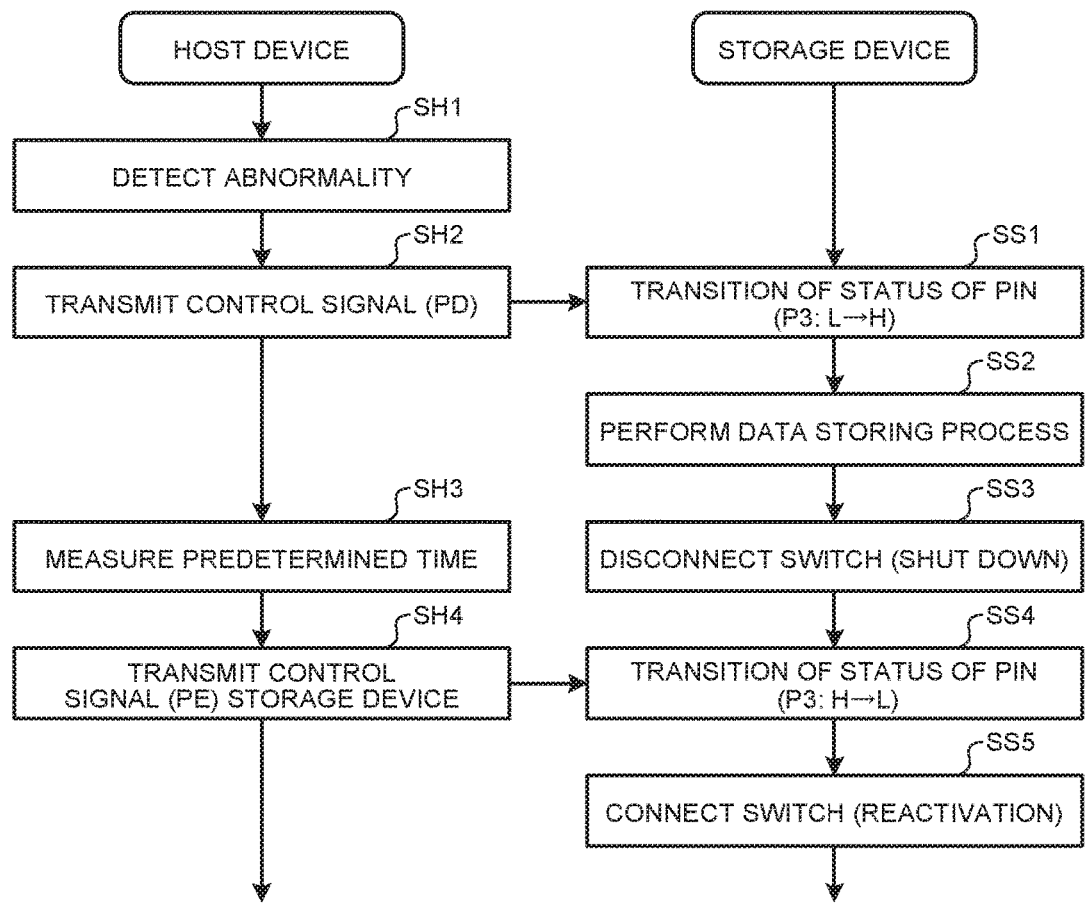
FIG. 8 is a table listing potentials of the respective parts of the switch control unit which is included in the storage device, statuses of the switch, and specifications of the interfaces of the corresponding server device according to the embodiment.
FIG. 9 is an exemplary sequence diagram illustrating transmission of a signal between the server device and the storage device according to the embodiment.

In FIG. 8, the level of the signal Ss output by the logical circuit 160 corresponding to the levels of the potentials of the pin P1 and the pin P2, and the status of the switch are illustrated. As can be seen from FIG. 8, (a) in a case where the pin P1 is at the high level and the pin P3 is at the high level, the signal Ss as the output of the logical circuit 160 enters the low level, and in this case, the switches SW1 and SW2 enter the connection status. This case corresponds to (1) of FIG. 6.

(b) In a case where the pin P1 is at the low level and the pin P3 is at the low level, the signal Ss as the output of the logical circuit 160 enters the low level, and in this case, the switches SW1 and SW2 enter the connection status. This case corresponds to (2), a case where the pin P3 of (3) of FIG. 6 is at the level L, and to a case where the pin P1 of (4) is at the level L or the status NC.

(c) In a case where the pin P1 is at the low level and the pin P3 is at the high level, the signal Ss as the output of the logical circuit 160 enters the high level, and in this case, the switches SW1 and SW2 enter the disconnection status. This case corresponds to a case where the pin P3 of (3) of FIG. 6 is at the level H.

(d) In a case where the pin P1 is at the high level and the pin P3 is at the low level, the signal Ss of the logical circuit 160 enters the low level, and in this case, the switches SW1 and SW2 enter the connection status. This case corresponds to a case where the pin P1 of (4) of FIG. 6 is at the level H.

In this way, according to the switch control unit 120 of this embodiment, all the cases illustrated in FIG. 6 can be handled. In other words, even in a case where the storage device of this embodiment is connected to any one of the host devices (1) to (4) in conformity to the typical SAS interface illustrated in FIG. 6, an expected process can be performed without an unexpected disconnection of the switches SW1 and SW2.

In addition, in this embodiment, a delay circuit 170 is provided between the logical circuit 160 and the switches SW1 and SW2 (that is, between the AND circuit 162 and the switches SW1 and SW2). The delay circuit 170 includes a capacitor Cd which is provided between the logical circuit 160 (the AND circuit 162) and the ground GND. With the delay circuit 170, the signal Ss transmitted from the switch control unit 120 to the switches SW1 and SW2 can be delayed. In addition, with the delay circuit 170, it is possible to remove high frequency components from the signal Ss. Further, in the power source circuit 130, a fuse 131 is provided between the pins P7 to P9 through which the 5 [V] power is supplied and the switch SW1, and between the pins P13 to P15 through which the 12 [V] power is supplied and the switch SW2.

In addition, as illustrated in FIG. 7, in this embodiment, the power of the logical circuit 160 is introduced from the power source circuit 130. In other words, the switch control unit 120 is configured to operate by the power supplied through the pins P7 to P9 or the pins P13 to P15. However, as described above, the switch control unit 120 operates at 3.3 [V], the pins P7 to P9 operate at 5 [V], and the pins P13 to P15 operate at 12 [V]. Therefore, a potential adjusting unit 163 is provided between the pins P7 to P9 or the pins P13 to P15 and the logical circuit 160 to convert the potential from 5 [V] or 12 [V] to 3.3 [V]. The potential adjusting unit 163, for example, may include a low drop out (LDO) serving as a voltage regulator or a DC-DC converter (DDC). Further, the voltage adjusting unit 163 may obtain 3.3 [V] from any one of 5 [V] and 12 [V].

In FIG. 9, a processing procedure in the host device and the storage device corresponding to the power disable is illustrated. As illustrated in FIG. 9, when an abnormality is detected (SH1), the host device transmits the control signal (power disable) to the storage device 100 (SH2). The transmission of the control signal in SH2 corresponds to a transition in the potential of the pin P3 from the low level to the high level. When a transition (a transition of the electrical status) occurs in the potential of the pin P3 (SS1), the storage device 100 performs a data storing process (SS2). The data storing process in SS2 is also called a power loss protection (PLP). Specifically, the controller 104 performs ending of the data reading or writing, discarding of a queue, and backing up of a logical/physical addresses transmission table as the PLP. In this embodiment, since the above-mentioned delay circuit 170 (see FIG. 7) is provided, the process of the PLP in SS2 is more reliably performed. In other words, a process time of the PLP can be more reliably secured. Next, at a timing after the process of the PLP is ended, the switches SW1 and SW2 enter the disconnection status by the signal Ss which is output according to the operation in the logical circuit 160 of the switch control unit 120 based on the transition in the potential of the pin P3 (SS3). On the other hand, the host device measures an elapsed time after the control signal (power disable) is transmitted, and when a predetermined time is elapsed (SH3), the host device transmits the control signal (power enable) to the storage device 100 (SH4). The transmission of the control signal in SH4 corresponds to a transition in the potential of the pin P3 from the high level to the low level. In the storage device 100, when a transition (a transition in the electrical status) in the potential of the pin P3 occurs from the high level to the low level (SS4), the switches SW1 and SW2 enter the connection status by the signal Ss which is output according to the operation in the logical circuit 160 of the switch control unit 120 based on the transition in the potential of the pin P3 (SS5). Therefore, the storage device 100 is reactivated.

In the storage device 100 of the above-mentioned embodiment, the statuses of the switches SW1 and SW2 are different according to the potentials (the electrical statuses) of the pin P1 (the first terminal) and the pin P3 (the second terminal).

Specifically, as illustrated in (a) of FIG. 8, in a case where the potential of the pin P3 is at the high level, and the potential of the pin P1 is at the high level, the switches SW1 and SW2 are controlled to enter the connection status. Since this case corresponds to the case of the specification (1) illustrated in FIG. 6, an expected status is that the switches SW1 and SW2 are in the connection status. The device of the specification (1) of FIG. 6 (that is, a device which is in conformity to SAS1, SAS2, and SAS2.1 and has a specification that 3.3 [V] is applied to the pins P1 to P3) is an example of the first device of this embodiment.

In addition, as illustrated in (c) of FIG. 8, in a case where the potential of the pin P3 is at the high level and the potential of the pin P1 is at the low level, the switches SW1 and SW2 are controlled to enter the disconnection status. Since this case corresponds to the case where the potential of the pin P3 of the specification (3) illustrated in FIG. 6 is at the high level, an expected status is the disconnection status of the switches SW1 and SW2. The device of the specification (3) of FIG. 6 (that is, a device which is in conformity to SAS3 and has a specification corresponding to the power disable) is an example of the second device of this embodiment. Further, as described above, in this embodiment, the non-connection statuses (NC) of the pin P1 and the pin P3 can be handled as the low level by the pull-down circuit 150.

In addition, as illustrated in (b) and (d) of FIG. 8, in a case where the potential of the pin P3 is at the low level, the switches SW1 and SW2 are controlled to enter the connection status regardless of the potential of the pin P1. Since this case corresponds to the case of the specification (2), the case of the specification (4), and the case where the potential of the pin P3 of the specifications (3) is at the low level illustrated in FIG. 6, an expected status is the connection status of the switches SW1 and SW2. The device of the specification (2) and the device of the specification (4) of FIG. 6 (that is, a device which is in conformity to SAS1, SAS2, and SAS2.1 and has a specification that 3.3 [V] is not applied to the pins P1 to P3), and a device which is in conformity to SAS3 and has a specification that does not correspond to the power disable are examples of the third devices of this embodiment.

In this way, according to this embodiment, since the switch control unit 120 switches the connection status and the disconnection status of the switches SW1 and SW2 according to the electrical statuses of the pin P1 and the pin P3, an expected connection statuses of the switches SW1 and SW2 corresponding to the specification of the host device and the control signal are easily obtained.

In addition, in this embodiment, the switch control unit 120 includes the logical circuit 160. Therefore, it is possible to obtain the switch control unit 120 which controls the switches SW1 and SW2 to enter an expected status according to the specification and the control signal as a relatively simple configuration.

<First Modification>

Figure 10:
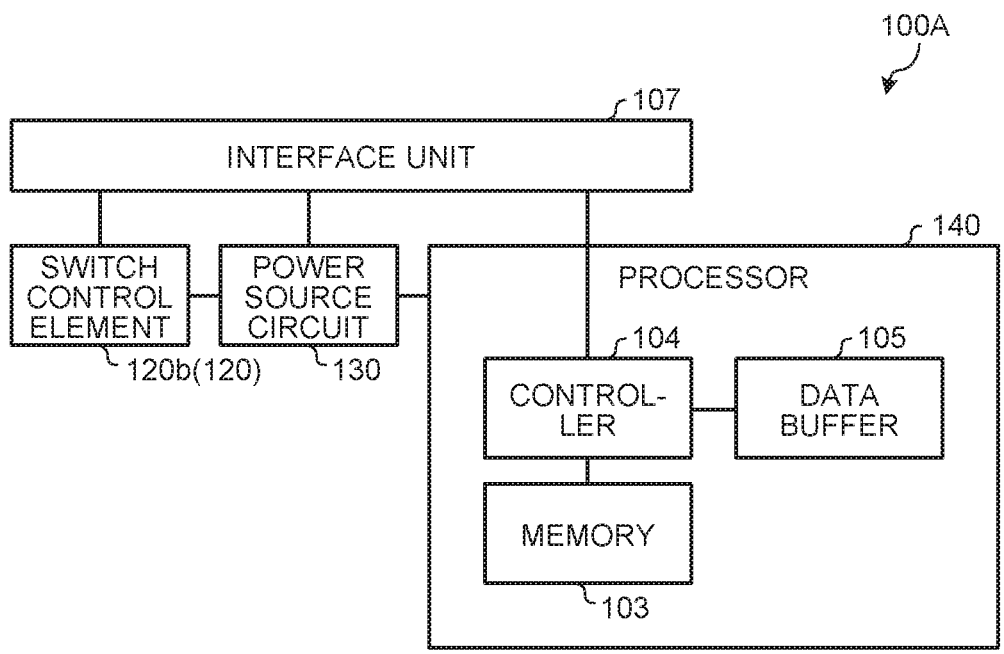
FIG. 10 is an exemplary block diagram schematically illustrating a storage device of a first modification.

FIG. 10 is an exemplary block diagram schematically illustrating a storage device of a first modification. As illustrated in FIG. 10, in a storage device 100A of this modification, the switch control unit 120 is configured as a switch control element 120b. The switch control element 120b, for example, may be configured as a semiconductor element or an integrated circuit such as an application specific integrated circuit (ASIC), a field programmable gate array (FPGA), or a programmable logic device (PLD). The same effects (results) as those of the above embodiment can be obtained in this modification.

<Second Modification>

Figure 11:
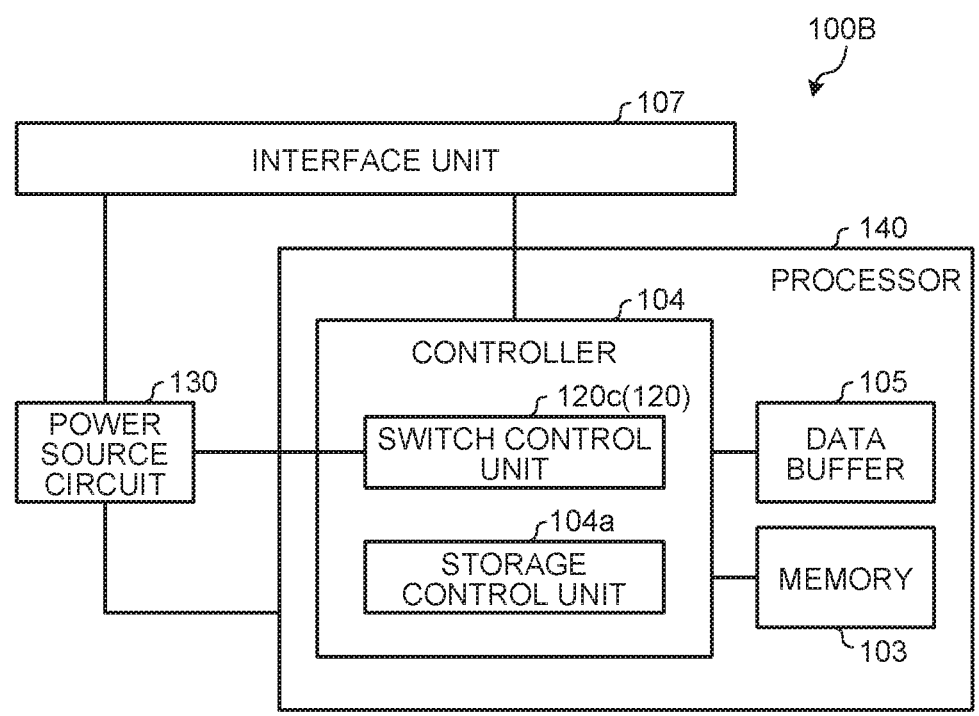
FIG. 11 is an exemplary block diagram schematically illustrating a storage device according to a second modification.

FIG. 11 is an exemplary block diagram schematically illustrating a storage device of a second modification. As illustrated in FIG. 11, in a storage device 100B of this modification, a switch control unit 120c (120) is included in the controller 104. In other words, the controller 104 performs the arithmetic process according to a program (software) such as firmware, so that a function of the switch control unit 120c is realized together with a function of the conventional storage control unit 104a. The same effects (results) as those of the above embodiment are obtained in this modification.

Figure 12:
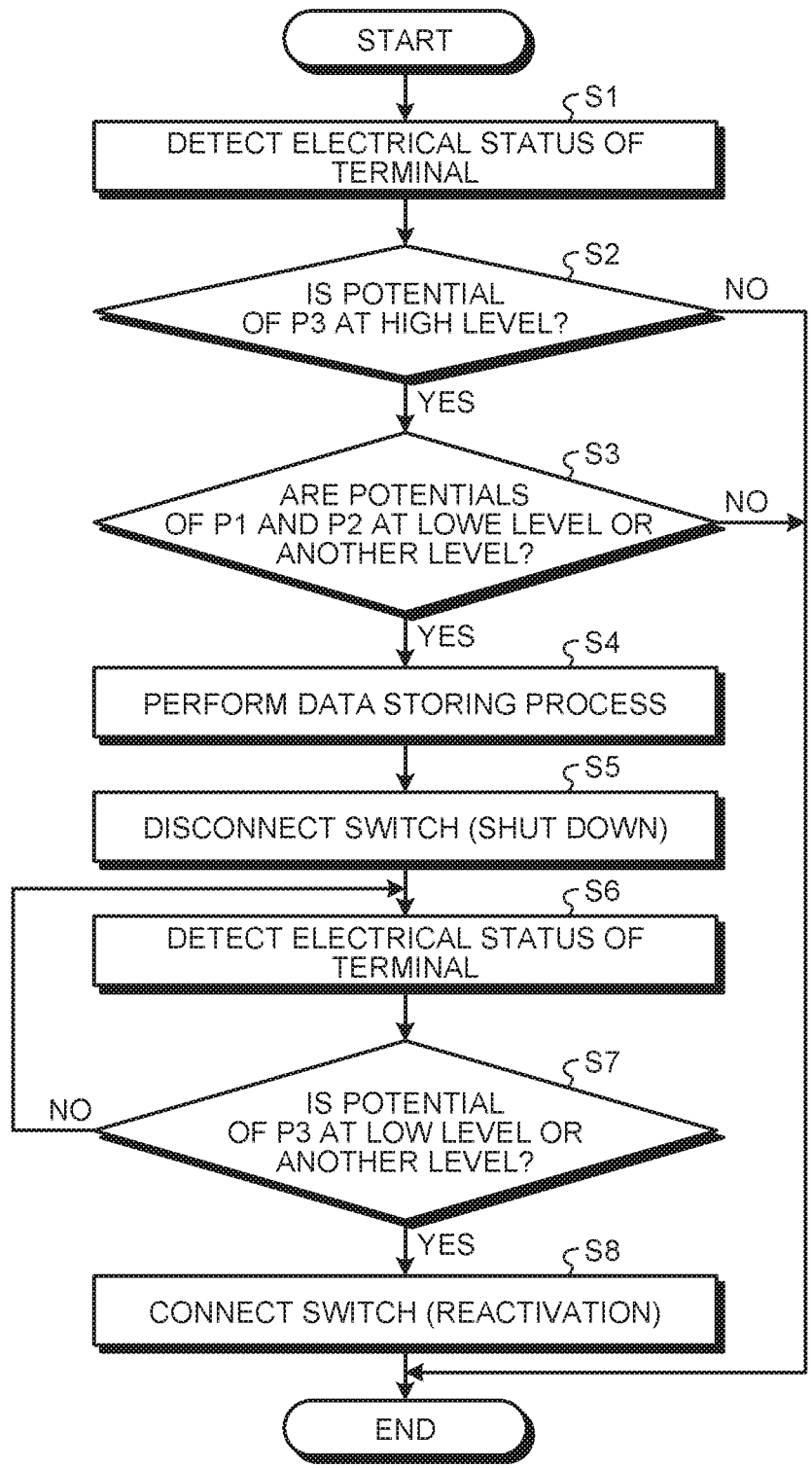
FIG. 12 is an exemplary flowchart schematically illustrating a processing procedure performed by the storage device according to the second modification.

FIG. 12 is an exemplary flowchart schematically illustrating a processing procedure performed by the storage device of the second modification. In FIG. 12, a process of the power disable is illustrated. First, the controller 104 serving as the switch control unit 120c (120) detects the potentials (the electrical statuses) of the pins P1 and P3 (terminals) (S1). In a case where the potential of the pin P3 is at the high level (Yes in S2) and the potentials of the pins P1 and P2 are at the low level or at another level different from the high level and the low level (Yes in S3), the controller 104 performs a data storing process such as the PLP (S4), and controls the switches SW1 and SW2 to enter the disconnection status (S5). Next, the controller 104 detects the potentials (the electrical statuses) of the pins P1 and P3 (terminals) (S6). In a case where the potential of the pin P3 is at the low level or at another level different from the high level and the low level (Yes in S7), the controller 104 controls the switches SW1 and SW2 to enter the connection status (S8). In S8, the storage device 100B is reactivated. Further, in the case of No in S2 and No in S3, the flow of FIG. 12 is not performed. In addition, in the case of No in S7, the procedure returns to S6.

Figure 13:
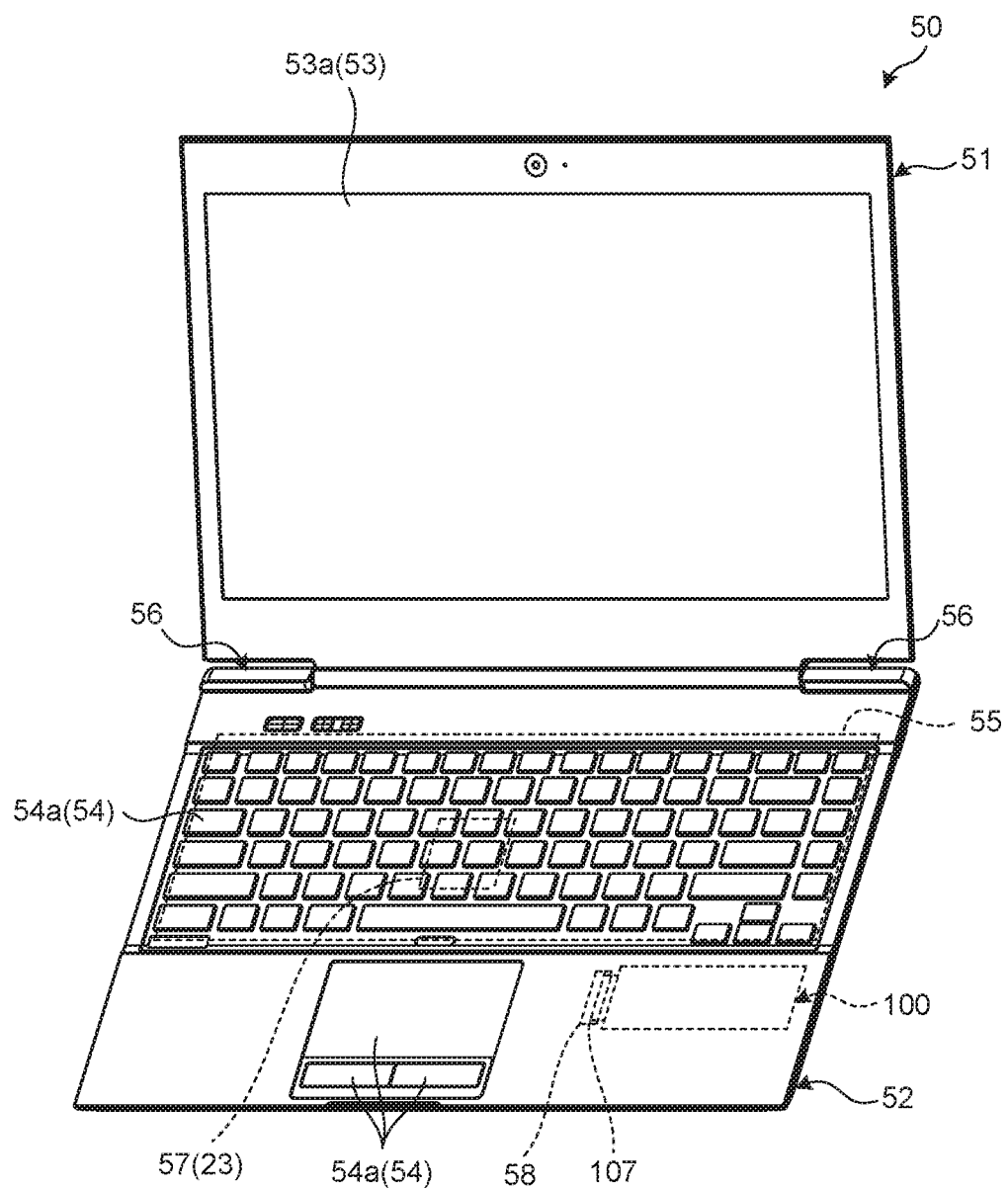
FIG. 13 is an exemplary perspective view illustrating an electronic apparatus in which the storage device according to the embodiment is assembled.

In addition, the storage device 100 according to the above embodiment, the modification, or an equivalent thereof may be applied to any device other than the server device. FIG. 13 is an exemplary perspective view illustrating an electronic apparatus in which the storage device of the embodiment is assembled. As illustrated in FIG. 13, the storage device 100 may be used in the electronic apparatus 50 such as a personal computer. The electronic apparatus 50 includes housings 51 and 52, a display 53, and an input device 54. The housing 51 and the housing 52 are rotatably connected to each other through a hinge member 56. The display 53 is contained in the housing 51 in a state where a display screen 53a is exposed, and the input device 54 is contained in the housing 52 in a state where an input unit 54a is exposed. The display 53, for example, is an LCD or an OELD. The input device 54, for example, is a keyboard, a pointing device, or click buttons. In addition, in the housing 52, a circuit board 55 in which electronic components (not illustrated) such as a central processing unit (CPU) 57 and the controller are built, and the storage device 100 is contained. The circuit board 55 and the storage device 100 are electrically connected to each other through a wiring such as a flexible printed wiring board, a connector 58 provided in the electronic apparatus 50, or the interface unit 107 of the storage device 100 connected to the connector 58. The interface units 58 and 107 transmit a signal between the electronic apparatus 50 and the storage device 100. The electronic apparatus 50 is an example of the host device, the CPU 57 is an example of the host control unit 231 (the control unit 23). Further, the host control unit 231 may be any unit other than the CPU 57. In addition, the electronic apparatus is not limited to a clamshell PC, but may be a desktop PC or other electronic apparatuses.

While the present embodiments have been exemplified above, the present embodiments are examples and not intended to limit the scope of the invention. The present embodiments can be implemented in other various modes, and various kinds of omission, replacement, combination, and change can be made in the scope without departing from the gist of the present invention. The present embodiments are included in the scope and gist of the invention and further included in the scope equivalent to the inventions recited in the scope of claims. Further, the structures and shapes in the respective present embodiments and modified example can be partially switched for implementation. Additionally, the specification such as the respective structures and shapes (structure, type, direction, shape, size, length, width, thickness, height, number, arrangement, position, material, etc.) can be suitably changed for implementation.

The invention claimed is:

1. A server device comprising:
   a power supply circuit; and
   a plurality of storage devices, wherein one of the storage devices is configured to be connectable to another server device,
   the storage device comprising:
      a memory configured to store data;
      a control circuit configured to control writing of data to the memory and reading of data from the memory;
      an interface circuit that includes at least a first terminal, a second terminal, and a third terminal, the third terminal being a terminal through which a first power having a first voltage is supplied to the storage device, and
      a switch control circuit configured to control switching between a connection status and a disconnection status based on statuses of the first terminal and the second terminal, the connection status representing that power corresponding to the first power is supplied to the control circuit and the memory, the disconnection status representing that the power corresponding to the first power is not supplied to the control circuit and the memory, wherein
         while the storage device and the server device are connected, the first terminal has a first status, and the second terminal has a second status representing that a second power having a second voltage is supplied to the storage device therethrough, and
         while the storage device and the another server device are connected, the first terminal has a third status different from the first status, and the second terminal has a fourth status representing that a control signal is input from the another server device to the storage device therethrough.

2. The server device according to claim 1, wherein the switch control circuit is configured to control the switching between the connection status and the disconnection status based on the status of the first terminal such that the connection status is obtained in a case where the status of the first terminal is the first status, and the connection status and the disconnection status are switched according to the control signal in a case where the status of the first terminal is the third status.

3. The server device according to claim 1 wherein
   the storage device is further connectable to a third device, and while the storage device and the third device are connected, a third power having a third voltage is supplied to the storage device through the third terminal, and either the first power or the control signal is not input to the storage device through the second terminal, and
   the switch control circuit is configured to control the switching to the connection status in the case where the storage device and the third device are connected.

4. The server device according to claim 1, wherein in a case where potential of the first terminal is at a high level and potential of the second terminal is at a high level, the connection status is obtained, and in a case where the potential of the first terminal is at a low level that is lower than the high level or at another level different from the high level and the low level and the potential of the second terminal is at the high level, the disconnection status is obtained.

5. The server device according to claim 1, wherein in a case where potential of the second terminal is at a low level that is lower than the high level or another level different from a high level and the low level, the connection status is obtained regardless of potential of the first terminal.

6. The server device according to claim 1, wherein the switch control circuit includes a logical circuit which performs a logical operation based on levels of the potentials of the first terminal and the second terminal.

7. The server device according to claim 1, wherein
the first terminal is any one of P1 pin and P2 pin of a power source interface in the SAS standard,
the second terminal is P3 pin of the power source interface, and
the third terminal is any one of P7 pin, P8 pin, P9 pin, P13 pin, P14 pin, and P15 pin of the power source interface.

8. A server device comprising:
a power supply circuit; and
a plurality of storage devices, wherein one of the storage devices is configured to be connectable to another server device,
the storage device comprising:
a memory configured to store data;
a first control circuit configured to control writing of data to the memory and reading of data from the memory;
an interface circuit that includes at least a first terminal, a second terminal, and a third terminal, the third terminal being a terminal through which a first power having a first voltage is supplied to the storage device in a case where the storage device and the another server device are connected, and
a second control circuit configured to control switching between a connection status and a disconnection status based on statuses of the first terminal and the second terminal, the connection status representing that power corresponding to the first power is supplied to the first control circuit and the memory, the disconnection status representing that the power corresponding to the first power is not supplied to the first control circuit and the memory, wherein
while the storage device and the server device are connected, the first terminal and the second terminal have the same status, and
while the storage device and the another server device are connected, the second terminal serves as a terminal through which a control signal is input from the another server device to the storage device.

9. The server device according to claim 8, wherein the second control circuit is configured to control the switching between the connection status and the disconnection status based on the status of the first terminal such that the connection status is obtained in a case where the first terminal is connected to the server device, and the connection status and the disconnection status are switched according to the control signal in a case where the first terminal is connected to the another server device.

10. The server device according to claim 8 wherein
the storage device is further connectable to a third device, and while the storage device and the third device are connected, the first power is supplied to the storage device through the third terminal, and either a second power having a second voltage or the control signal is not input to the storage device through the second terminal, and the second control circuit is configured to control the switching to the connection status in the case where the storage device and the third device are connected.

11. The server device according to claim 8, wherein in a case where potential of the first terminal is at a high level and potential of the second terminal is at a high level, the connection status is obtained, and in a case where the potential of the first terminal is at a low level that is lower than the high level or at another level different from the high level and the low level and the potential of the second terminal is at the high level, the disconnection status is obtained.

12. The server device according to claim 8, wherein in a case where potential of the second terminal is at a low level that is lower than the high level or another level different from a high level and the low level, the connection status is obtained regardless of potential of the first terminal.

13. The server device according to claim 8, wherein
the second control circuit includes a logical circuit which performs a logical operation based on levels of the potentials of the first terminal and the second terminal.

14. The server device according to claim 8, wherein
the first terminal is any one of P1 pin and P2 pin of a power source interface in the SAS standard,
the second terminal is P3 pin of the power source interface, and
the third terminal is any one of P7 pin, P8 pin, P9 pin, P13 pin, P14 pin, and P15 pin of the power source interface.

15. A server device comprising:
a power supply circuit; and
a plurality of storage devices, wherein one of the storage devices is configured to be connectable to another server device,
the storage device comprising:
a memory configured to store data;
a first control circuit configured to control writing of data to the memory and reading of data from the memory;
an interface circuit that includes at least a first terminal and a second terminal, and
a second control circuit configured to control switching between a first status and a second status based on statuses of the first terminal and the second terminal, the first status representing that the interface circuit is electrically connected to the first control circuit and the memory, the second status representing that the interface circuit is electrically disconnected from the first control circuit and the memory, wherein
while the storage device and the server device are connected, the first terminal has a third status, and the second terminal has a fourth status representing that a first power having a first voltage is supplied to the storage device therethrough, and
while the storage device and the another server device are connected, the first terminal has a fifth status different from the third status, and the second terminal has a sixth status representing that a control signal is input from the server device to the storage device therethrough.

16. The server device according to claim 15, wherein
the second control circuit is configured to control the switching between the first status and the second status based on the status of the first terminal and the status of the second terminal and the status of the second terminal such that the first status is obtained in a case where the first terminal has the third status and the second terminal has the fourth status, and the first status and the second status are switched according to the control signal in a case where the first terminal has the fifth status and the second terminal has the sixth status.

17. The server device according to claim 15 wherein the storage device is further connectable to a third device, and while the storage device and the third device are connected, a third power having a third voltage is supplied to the storage device, and either the control signal or a second power having a second voltage is not input to the storage device through the second terminal, and the second control circuit is configured to control the switching to the first status in the case where the storage device and the third device are connected.

18. The server device according to claim 15, wherein in a case where potential of the first terminal is at a high level and potential of the second terminal is at a high level, the first status is obtained, and in a case where the potential of the first terminal is at a low level that is lower than the high level or at another level different from the high level and the low level and the potential of the second terminal is at the high level, the second status is obtained.

19. The server device according to claim 15, wherein in a case where potential of the second terminal is at a low level that is lower than the high level or another level different from a high level and the low level, the first status is obtained regardless of potential of the first terminal.

20. The server device according to claim 15, wherein the second control circuit includes a logical circuit which performs a logical operation based on levels of the potentials of the first terminal and the second terminal.

21. The server device according to claim 15, wherein the first terminal is any one of P1 pin and P2 pin of a power source interface in the SAS standard, and the second terminal is P3 pin of the power source interface.

\* \* \* \* \*